US007392515B2

(12) United States Patent
Kimelman et al.

(10) Patent No.: US 7,392,515 B2
(45) Date of Patent: Jun. 24, 2008

(54) PROGRAM COMPONENTS HAVING MULTIPLE SELECTABLE IMPLEMENTATIONS

(75) Inventors: Douglas N. Kimelman, Hawthorne, NY (US); Vadakkedathu T. Rajan, Briarcliff Manor, NY (US); Tova Roth, Woodmere, NY (US); Vugranam C. Sreedhar, White Plains, NY (US); Mark N. Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/073,630

(22) Filed: Feb. 11, 2002

(65) Prior Publication Data

US 2002/0154551 A1    Oct. 24, 2002

Related U.S. Application Data

(60) Provisional application No. 60/267,573, filed on Feb. 9, 2001.

(51) Int. Cl.
*G06F 9/44* (2006.01)
*G06F 9/45* (2006.01)

(52) U.S. Cl. .................. 717/158; 717/127; 717/131; 717/151

(58) Field of Classification Search ......... 717/127–128, 717/130–133, 163–170, 148, 157–158
See application file for complete search history.

(56) References Cited

U.S. PATENT DOCUMENTS 5,488,727 A * 1/1996 Agrawal et al. ............. 717/154
5,752,038 A * 5/1998 Blake et al. ................. 717/158
5,862,386 A * 1/1999 Joseph et al. ............... 717/170
6,324,619 B1 * 11/2001 Raverdy et al. ............. 717/120
6,360,360 B1 * 3/2002 Bates et al. ................. 717/160
6,487,714 B1 * 11/2002 Azagury et al. ............. 717/116
6,530,075 B1 * 3/2003 Beadle et al. ............... 717/114
6,622,300 B1 * 9/2003 Krishnaswamy et al. .... 717/130
6,658,656 B1 * 12/2003 Thompson .................. 717/151
6,769,126 B1 * 7/2004 Pekowski .................... 719/331

OTHER PUBLICATIONS

Orr, Mecklenburg, Hoogenboom, Lepreau "Dynamic Program Monitoring and Transformation Using The OMOS Object Server", 1993, System Sciences, pp. 232-241 vol. 1.*
Orr, Lepreau, Law "Program Specialization Using the OMOS System", 1995, Technical Report UUCS-95-016.*
Orr, Mecklenburg "OMOS—An Object Server for Program Execution", 1992 Object Orientation in Operating Systems, pp. 200-209.*
Oikawa, Sugiura, Tokuda "Adaptive object management for qa reconfigurable microkernel", 1996, Object-Orientation in Operating Systems, pp. 67-71.*

* cited by examiner

*Primary Examiner*—Lewis A. Bullock, Jr.
*Assistant Examiner*—Jason Mitchell
(74) *Attorney, Agent, or Firm*—Michael J. Buchenhorner; Vazken Alexanian

(57) ABSTRACT

Libraries and individual program components are provided with a common interface and a number of alternative implementations (e.g. hash table, tree, compressed) which can be selected. The component is instrumented to measure a cost of each of its alternative implementations, both independent of and in the context of the interaction of that component with other components of the computer program. Based on measured cost, the desired implementation is chosen for the component by an external controller that is generic to the computer program or by an application program that interfaces with the library or component.

11 Claims, No Drawings

PROGRAM COMPONENTS HAVING MULTIPLE SELECTABLE IMPLEMENTATIONS

CROSS-REFERENCE TO RELATED APPLICATIONS

This application claims the benefit of U.S. Provisional Application No. 60/267,573, filed Feb. 9, 2001.

The present application is related to the present inventors' applications entitled "Minimizing Interaction Costs Among Components Of Computer Programs" Ser. No. 10/073,628, and "Characterization Of Objects Of A Computer Program While Running Same" Ser. No. 10/073,608, which were filed on the same day as the present application. These related applications are incorporated herein by reference in their entirety.

FIELD OF THE INVENTION

This invention generally relates to the field of optimization of computer programs, and more particularly relates to a computer system that transforms programs so that they run more quickly, but produce the same results. More particularly, the present invention relates to the use of components, which have a number of selectable implementations, to help achieve such optimization.

PRIOR ART

Languages like SETL (see (1) Schwartz J, "Automatic Data Structure Choice in a Language of Very High Level" CACM December 1975, pp 722-728., (2) Schwartz J, "Optimization of Very High Level Languages, Parts I, II" J. Of Comp. Lang, 1975 pp. 161-218) and VERS (J. Earley. High level iterators and a method for automatically designing data structure representation. J. of Computer Languages, 1976 also propose alternative implementations for basic data types such as sets. SETL uses type-based static analysis to select the best implementation for a given instance of the set representation. Our solution was to model the problem as a graph problem and use dynamic profile information to compute edge weights and to characterize properties that are distinguishable from one run to another run. Both SETL and VERS rely purely on static information which probably will give them worse performance. It is believed that a need exists to write efficient libraries and other components.

For consistency of definition in the context of the present application, it should be understood that the term "property", with respect to an object or component of a computer program, is broad, and includes narrower terms such as "location", "parameter", and "implementation ". In turn, "implementation" includes "data representation" such as "string representation" (e.g. ASCII, EBCDIC, UNICODE) and "data structure" (e.g. hash, tree, compressed). Thus, it will be understood that "implementation" does not encompass "location", nor "parameter" within its meaning. Moreover, in the context of the present invention, "object", "entity", and "component" shall be interpreted as having substantially the same meaning, while "library" shall be understood to mean a group of object definitions or component definitions.

SUMMARY OF THE INVENTION

Broadly, the present invention provides a method of minimizing the cost of using a component of a computer program, the aforesaid method comprising the steps of:

a) providing the aforesaid component with a plurality of explicit selectable alternative implementations which share a common component interface and semantics;

b) instrumenting the aforesaid component to gather cost-related information during at least a partial run of the aforesaid program;

c) providing the component with a cost estimator for using the aforesaid cost-related information to estimate a cost for using each of the explicit selectable alternative implementations in running the program;

d) based on the costs estimated in step (c), selecting one of the aforesaid explicitly selectable implementations for a subsequent at least partial run of the program.

Preferably, a default implementation is used during said at least partial run.

According to a preferred embodiment, selecting step (b) is carried out by an other program component which is operable as a controller for the program. According to another alternative, the selection may be carried out by an application program which interfaces with the aforesaid component.

The invention also provides a computer readable medium readable by a computer and including computer instructions for carrying out the methods disclosed hereinabove.

The invention also provides a computer program comprising a plurality of components which interact during running thereof, at least one of the aforesaid components comprising:

a) a plurality of explicit selectable alternative implementations;

b) a common interface and semantics for receiving messages from an other one of the aforesaid components and sending messages thereto;

c) an instrumentation for gathering cost-related information during at least a partial run of the computer program;

d) a cost estimator for using the cost-related information to estimate a cost for using each of the explicit selectable alternative implementations; and e) a selector for choosing one of the alternative implementations in response to a message received at the aforesaid interface from one of an application program and an other one of the program components.

DESCRIPTION OF THE PREFERRED EMBODIMENTS

Writing efficient libraries or generic components intended to interact with other components is often difficult or impossible because the library and component writers do not understand the runtime context in which the library or component will be used. Moreover, the user of a library or component should not need to understand the internal workings of the component in order to use it efficiently or to decide exactly which of a number of possible alternative candidate components to choose, and in fact sometimes for the purpose of protecting intellectual property the user is not allowed to know the internal workings. Therefore, the user of a component cannot know if the component is appropriate in their context. Use of inappropriate components is a major reason for inefficiency of modern software.

According to another preferred embodiment of the present invention, a computer system and method allows a component writer to specify multiple algorithms and data structures for their implementation and to have the run time environment determine which one to choose, using information about the context in which the component will be used. The component writer will not only provide implementations but will also include instrumentation. The instrumentation will be run along with the implementations—at least some of the time.

Based on the information gathered by the instrumentation, the appropriate implementation will be chosen.

The preferred embodiment for this system and method uses the well-known Hyper/J system. Hyper/J allows for the composition of two or more programs written in Java. In particular it allows taking two descriptions of a class and puts the methods described in both descriptions together in a variety of ways. We propose a new composition rule in the Hyper/J sense. A simple example of a known composition rule is that if both descriptions include a definition of a particular method the composed description will in fact run both methods when in the program the method name is invoked on an instance of that class. We will call this composition rule "merge".

In our composition rule the programmer supplies instrumentation methods, two or more implementations for the methods of the class, and a formula for each implementation. There is a list of implementations, and the first one is somewhat arbitrarily chosen as the preferred implementation. On the first run of the program the composed class will run as though it were simply a composition of the instrumentation methods and the preferred implementation using the merge composition rule. The methods of the instrumentation would set some class attributes, which would be placed in persistent storage at the end of the program.

At the start of each subsequent run of the program, the values of the attributes are used in the formulas and the formula produces values. The formula will compute an approximation to the cost of the corresponding implementation would have on this run. Thus, the implementation with the smallest value would have been the most efficient.

That implementation will be the one that should be used next time. The choosing of the implementation might be done by the JVM, which would have been modified to understand about classes composed using this composition rule. A more complex implementation might avoid using a modified JVM, but rather when the first object of a class is created, the composed class could be constructed in such a way that the formula is evaluated and the implementation chosen.

A more sophisticated technique would involve modifying each new statement in the user program that creates an instance of the composed class. For each new statement, a subclass of the composed class would be created. Each subclass would have the same code, but would store the results of their instrumentation in different class objects. This would have to be done carefully and perhaps could not be done in every case, because if the user has written code to modify the class object's attributes, then that code must refer to the same attributes for all the instances of the original class, not just the ones allocated at a particular new statement.

A possible solution is to have the user code modify the attributes of the super class, which corresponds to the user's source class, rather than modifying the attributes of the inserted class variables. The advantage of separating the class into different almost identical classes one for each new statement is that if different implementations are appropriate for different objects in the running program, this separation at least allows that some of the time. In particular, when all or most objects created at a particular point in the program should have the same implementation, then this mechanism would allow that.

EXAMPLE

Multiple Implementations of a Library or Component

This section will show by example how a component or library writer can provide multiple implementations of their component. They will be responsible not only for providing multiple implementations but they will also be responsible for providing code that determines the cost of using those implementations. The cost comes in two flavors 1) the cost incurred by an object when using the implementation by itself and 2) the cost of the interactions of two objects when the objects have different implementations. At run time the system will be responsible for using the information gathered during the profiling runs from the costs functions to choose good implementations.

While in some cases the decision about the appropriate choice of implementation of an object can be made by examining the kind of use that is made of it, in other cases this decision would have to be coordinated with the corresponding decisions made for other objects that interact with this object. The later happens when the costs for interactions are relatively high. For example, the decision about the placement of an object in a network of computers is affected by the decision about the placement of other objects that interact with this object. The problem thus becomes a combinatorial one, which even an experienced programmer cannot make well without the kind of analysis we discuss in this.

We illustrate the concepts using a Set class of objects. The basic Set operations are defined in the outer Set class. The inner nested classes provide multiple implementations for the operations defined in the outer of Set class. Initially mySet will be set to a default implementation for the profiling run, and can be reset to a different implementation in later runs using our analysis framework described in this. Set is used as an illustrative example. The choice of implementations of sets often is not fundamentally dependent on the way that set interacts with other sets. As we alluded to earlier, in other optimizations such as distribution of objects the interaction is the dominant issue. We chose sets because they illustrate the concepts simply.

In order to relate the following code lines with elements of the present invention that have been summarized hereinabove, comments in UPPER CASE will be inserted.

```
class Set {
    private Object mySet = null;
    Private int size;
```

THE EXISTENCE OF A COMMON COMPONENT INTERFACE AND SEMANTICS NOW BEGINS TO BE EXPRESSED.

```
Set(String implementation){
    // mySet is set to the appropriate implementation based on the input String
    implementation.
        If (implemenation == "default" OR implementation == "TreeSet")
        mySet = new TreeSet( );
```

-continued

```
    Else if (implementation == "HashSet")
        MySet == new HashSet( );
    ...etc. }
void add(Element e) {
    mySet.add(e);
}
// return successor element of e
Element successor(Element e) {
    return mySet.sucessor(e) ;
}
void remove(Element e) {
    mySet.remove(e) ;
}
    Set copy(String implementation) {
    // Return a copy of this set which has implementation determined by the
    // input string implementation .....
    ........................      }
    Int size{ return mySet.size( );}
    Set union(Set s, String Implementation) {
    // Return a set which is the union of this set and s and has the
implementation determined my the string implementation.
    ....................      }
```

EXPRESSION OF THE COMMON COMPONENT INTERFACE IS NOW COMPLETE.

OPERABILITY OF THE COMPONENT IN A PLURALITY OF IMPLEMENTATIONS NOW BEGINS TO BE EXPRESSED.

```
class TreeSet{ //tree implementation
    TreeSet( ){...};
// implement the perations defined in Set.
void add(Element e) {...}
Element successor(Element e) {...}
void remove(Element e) {...}
// implement methods to compute
    }
```

THE NEXT 4 LINES, LATER REPEATED FOR OTHER ALTERNATIVE IMPLEMENTATIONS, EXPRESS THE INSTRUMENTATION OF THE COMPONENT TO MEASURE COST IN A TREE IMPLEMENTATION.

```
    // cost functions for TreeSet
    int treeSetCostAdd( ) {return log size( );}
    int treeSetCostSucessor( ){...}
    int treeSetCostRemove( ){...}
class HashSet { // hash implementation
    HashSet( ){...}
    // implement the operations defined in Set
    void add(Element e){...};
    ...
    }
    // define the corresponding cost functions for HashSet
    int hashSetcostAdd( ) {}
    ...
class CompSet { //compressed set
    CompSet( ){...}
    // implement the operations defined in Set.
    ....
    }
    // implement cost functions for CompSet
    ...
```

EXPRESSION OF THE OPERABILITY OF THE COMPONENT IN A PLURALITY OF ALTERNATIVE IMPLEMENTATIONS IS NOW COMPLETE.

```
// Next we define transformation functions
Set Tree2Hash(Set tree) {
// TreeSet to HashSet representation
}
Set Comp2Tree (Set comp) {
// CompSet to TreeSet representation
}
```

THE NEXT 4 LINES EXPRESS THE INSTRUMENTATION OF THE COMPONENT TO MEASURE COST BASED ON MINIMIZATION OF INTERACTION WITH OTHER COMPONENTS

```
    // define a single cost functions for
    // all the above transformations
        int costTransformation( ) {...}
    }
```

The Set class consists of four parts: (1) The basic operations defined in the outer class, (2) Different implementations for the basic operations defined in the inner classes, (3) Transformation functions to transform one implementation to another, and (4) cost functions defined for each implementation and cost function for transformations. In this example we will assume that the cost of transforming between two different implementations is the same regardless of which implementations, This approximation simplifies the decision problem and avoids requiring $n^2$ cost functions. In many cases the simplification is sufficiently accurate.

The implementor is responsible for providing cost functions that return the cost of each call in the different implementations, so the cost of the successor query for TreeSet should return log of the size of the tree. If two variables contain sets, there is a cost of cloning from one to the other, namely the cost of the copy. In our model the user who invokes the copy operation should not know the underlying representation. So, as part of a copy operation the system will invoke the correct transfer function, say tree2hashset in addition to making the copy. There is a cost of doing that additional conversion and in addition to writing the tree2hashset function the author of the multiple implementations must provide the coercioncost function so the system can understand the penalty of using different implementations.

A client that uses the Set class will simply create instances of objects of the Set class. Without our analysis the client will get the default implementation (TreeSet in our case). The implementor of the set class in this case chose TreeSet because it had the best worst-case performance and so was likely to run acceptably during the profile run. Using our framework a runtime system or a compiler or the application program will act as a controller to automatically ensure that the client, after the profile run, gets the best of the set implementations defined by the nested classes. In the following example we will express code for a simple client (i.e. application program) that wants to use the above Set. The process of selection of component implementation (controlling) is done in the application code.

```
Class Implementation{
        Public static String s1, s2,....,s5; }
class Client {
        public static main(String s[ ]) {
// Input from the user whether this is a monitoring run
// If this is a monitoring run, set up the system to do the monitoring
        // else just read the required implementation from storage
        If (!monitoring_run) {
```

THE FOLLOWING LINES EXPRESS THE SELECTION, IN ACCORDANCE WITH THIS ILLUSTRATIVE EMBODIMENT, OF AN ALTERNATIVE IMPLEMENTATION BASED ON COST INFORMATION WHICH IS IN STORAGE FROM A PRIOR MONITORING RUN.

```
        Read_from—storage(Implimentation.s1,....,Implementation.s5); }
        Else // prepare for the monitoring run {
        // First set the implementations to be default.
        Implementation.s1 = "default";
        .....
        Implementation s5 = "default";
        // Build the ObjectAffinityGraph with the nodes for each set
        ObjectAffinityGraph oag = new ObjectAffinityGraph(s1,s2,s3,s4,s5);
        }
            Set s1 = new Set(Implementation.s1) ;
            // add a bunch of elements
            // to s1 instance
            // if this is a monitoring run, then add the cost of the operations to the
            // appropriate place in the oag.
            If(monitoring_run) {
            // for each add operation on s1 add weight determined by the cost
            Oag.addEdgeWeight(s1, TreeSet, -s1.treeSetCostAdd( ));
            Oag.addEdgeWeight(s1,HashSet, -s1.hashSetCostAdd( ));
            //etc.
            ...
            Set s2 = s1.copy(Implementation.s2) ;
            If(monitoring_run) {
            //add the cost of interaction between s1 and s2.
            Oag.addEdgeWeight(s1,s2,s1.costTransformation( ));
            }
            // perform a bunch of successor
            // queries such as
            // find all elements that
            // fall between two values
        // if it is a monitoring run, then add the appropriate costs to oag.
            ...
            Set s3 = new Set(Implementation.s3) ;
            // add a bunch of elements
                // if it is a monitoring run, add the appropriate costs to oag
            ...
            Set s4 = s3.copy(Implementation.s4) ;
                //if it is a monitoring run, add the interaction cost between s3 and s4 in
oag
            // burn s4 into a ROM
            burnROM(s4) ;
                // if it is a monitoring run, add ....
            Set s5 = s4.union(s2, Implementation.s5);// s5 is a new set
        //If this is a monitoring run add appropriate edge weight between s4 and s5 and
        // also between s2 and s5.
            // perform a bunch of successor queries
                //Finally if this is a monitoring run then
                // Perform the graph cutting to determine a good (and if possible, the best)
            implementation for each of the data structures s1,...,s5 and store this for future
            use.        ...
            }
        }
```

The Client class creates a number of set instances and performs different kinds of operations on different instances. Using the analysis presented in "Minimizing Interaction Costs Among Components Of Computer Programs" Ser. No. 10/073,628, a runtime system or a compiler or the application program (the controller) can assign the right implementation for each of the set instances s1, s2, s3, s4, and s5. In this example, we show explicitly how the application program can select the appropriate component implementation. During a profile (monitoring) run of the client code information is gathered. During that run the default implementation (i.e., TreeSet) will be used. The application program (controller) invokes the cost methods for each implementation to compute the cost of using an implementation for a set instance. This cost includes the costs for invoking various operations that the client code (i.e. The application program) invokes. For instance, s1 invokes only add( ) operations, whereas s2 invokes operations to perform successor queries (not indicated in the Set class). Notice that s2 is a copy of s1, and so if s1 and s2 use different representation there is the cost of transforming s1 implementation to s2 implementation. The controller uses the cost information to create and Object Affinity Graph and find the desirable implementation using the techniques given in "Minimizing Interaction Costs Among Components Of Computer Programs" Ser. No. 10/073,628. The controller would store this result in a storage so that it can be used for subsequent (production) runs so as to achieve lower costs.

The preferred embodiments of the present invention can be realized in hardware, software, or a combination of hardware and software. A controller, according to the preferred embodiments of the present invention, can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include nonvolatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of selecting a lowest cost selectable implementation from a plurality of selectable implementations for a component of a computer program, the method comprising steps of:
   assigning a cost estimation formula to each one of the plurality of selectable implementations;
   instrumenting said component to gather cost related state information indicating a state of the component during at least a partial run of said computer program;
   computing an estimated cost for each one of the plurality of selectable implementations during said partial run by executing each selectable implementation's associated cost estimation formula, wherein the cost estimation formula takes as input the gathered cost related state information; and
   based on the estimated cost, selecting at runtime one of the plurality of selectable implementations for a subsequent at least partial run of the computer program, said one of the plurality of selectable implementations selected being the one with the lowest estimated cost.

2. The method as set forth in claim 1, wherein the selecting step is carried out by an other component operable as a controller.

3. The method as set forth in claim 1, wherein the selecting step is carried out by an application program.

4. The method of claim 1 further comprising a step of providing the component with the plurality of explicitly selectable implementations which share a common component interface and semantics.

5. A computer readable storage medium including computer instructions for carrying out a method of minimizing the cost of using a component of a computer program, the method comprising steps of:
   assigning a cost estimation formula to each one of the plurality of selectable implementations;
   instrumenting the component to gather cost related state information indicating a state of the component during at least a partial run of said program;
   computing an estimated cost for each one of the plurality of selectable implementations during said partial run by executing each selectable implementation's associated cost estimation formula, wherein the cost estimation formula takes as input the gathered cost related state information; and
   based on the estimated cost, selecting at runtime one of the plurality of selectable implementations for a subsequent at least partial run of the computer program, said one of the plurality of selectable implementations selected being the one with the lowest estimated cost.

6. The computer readable medium as set forth in claim 5, wherein a default implementation is used during the at least partial run.

7. The computer readable medium as set forth in claim 5, wherein the selecting step is carried out by an other component operable as a controller.

8. The computer readable medium as set forth in claim 5, wherein the selecting step is carried out by an application program.

9. The medium of claim 5 further comprising instructions for providing the component with the plurality of explicitly selectable implementations which share a common component interface and semantics.

10. A computer system including a processor for selecting a lowest cost selectable implementation from a plurality of selectable implementations for a component of a computer program, the system comprising:
- receiving a plurality of explicitly selectable alternative implementations of the component of a computer program;
- receiving messages from another one of the components and sending messages thereto;
- wherein the component comprises instrumentation for gathering cost related state information during at least a partial run of the computer program, the cost-related state information comprising a kind of use that is made of the component or corresponding decisions made for other components that interact with said component;
- a cost estimator for computing, during said partial run, an estimated cost for each selectable implementation by executing each selectable implementation's associated cost estimation formula, wherein the cost estimation formula takes as input the gathered cost related state information; and
- based on the estimated cost, selecting at runtime one of the plurality of selectable implementations for a subsequent at least partial run of the computer program, said one of the plurality of selectable implementations selected being the one with the lowest cost.

11. The computer system as set forth in claim 10, wherein one of the alternative implementations comprises a default implementation which is operational before operation of the selector.

* * * * *